United States Patent [19]

Boni et al.

[11] Patent Number: 5,355,923
[45] Date of Patent: Oct. 18, 1994

[54] LOCKING INSERT DEVICE FOR A TIRE CHAMBER

[75] Inventors: Bernard Boni, Champagne s/Oise; Bruno Pelletier, Villiers s/St Leu, both of France

[73] Assignee: Hutchinson, Paris, France

[21] Appl. No.: 13,696

[22] Filed: Feb. 4, 1993

[30] Foreign Application Priority Data

Feb. 18, 1992 [FR] France .................. 92 01829

[51] Int. Cl.⁵ .......................................... B60C 15/028
[52] U.S. Cl. ........................... 152/381.6; 152/399
[58] Field of Search ............... 152/379.3, 379.4, 379.5, 152/381.4, 381.5, 381.6, 399, 405

[56] References Cited

U.S. PATENT DOCUMENTS

| 4,374,535 | 2/1983 | Watts | 152/381.6 |
| 4,391,317 | 7/1983 | Savage | 152/381.6 X |
| 4,662,419 | 5/1987 | Winfield | 152/381.6 |
| 5,060,706 | 10/1991 | Jones et al. | 152/381.5 |

FOREIGN PATENT DOCUMENTS

| 2405141 | 8/1975 | Fed. Rep. of Germany | 152/399 |
| 2271945 | 5/1974 | France . | |
| 2234147 | 1/1975 | France | 152/399 |
| 2311667 | 5/1976 | France . | |
| 7900612 | 2/1978 | PCT Int'l Appl. . | |
| 686145 | 1/1953 | United Kingdom . | |
| 1348892 | 3/1974 | United Kingdom . | |
| 2038727 | 7/1980 | United Kingdom | 152/381.6 |
| 2199792 | 7/1988 | United Kingdom | 152/379.5 |
| 2238276 | 5/1991 | United Kingdom | 152/381.5 |

*Primary Examiner*—Russell D. Stormer
*Attorney, Agent, or Firm*—Vickers, Daniels & Young

[57] ABSTRACT

A locking insert device for a tire chamber adapted to be fitted to a vehicle wheel provided with a tubeless tire mounted on a well or drop center rim, the device being designed to oppose the coming off of the beads of the tire from the rim in the event of a puncture of said tire, said device comprising a strip of rigid material shaped as a ring that is split parallel to the axis of the rim equipped therewith with an abutment member for a bead on one at least of its circumferential borders, the ring having a cross-section that correspond at least in part to the shape of the rim against which it is pressed and held stationary by fastening devices rendered operative after the ring has been placed on the rim.

11 Claims, 4 Drawing Sheets

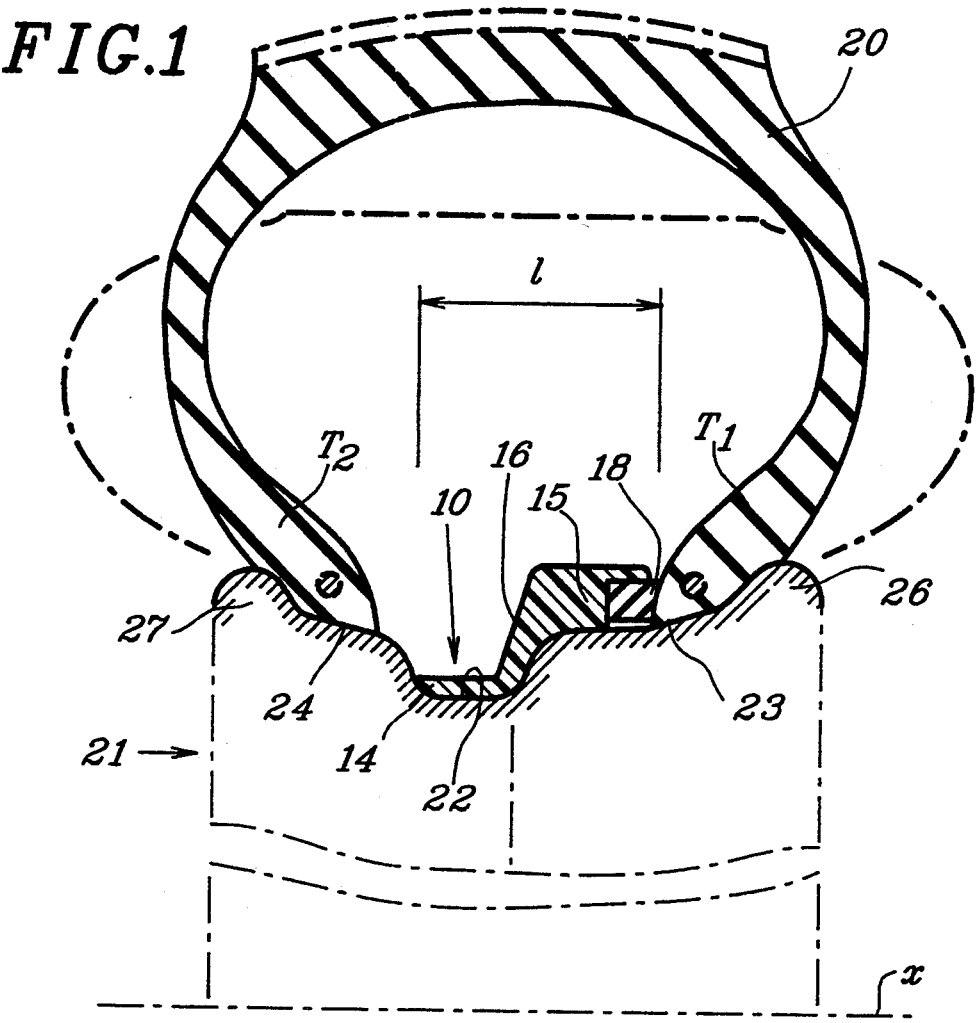
FIG.1
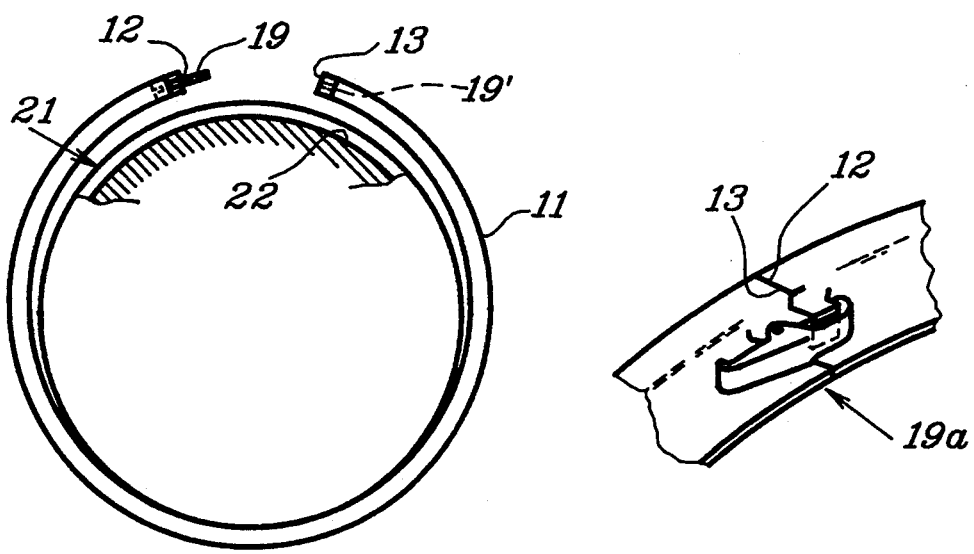
FIG.2                    FIG.2A

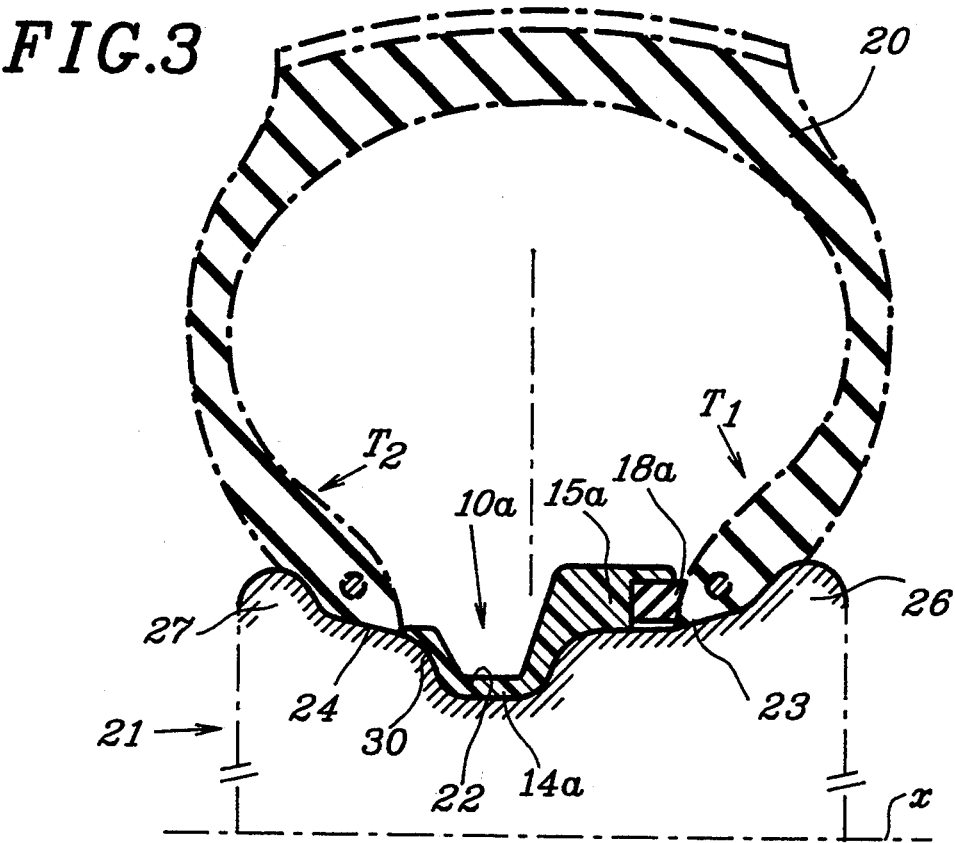
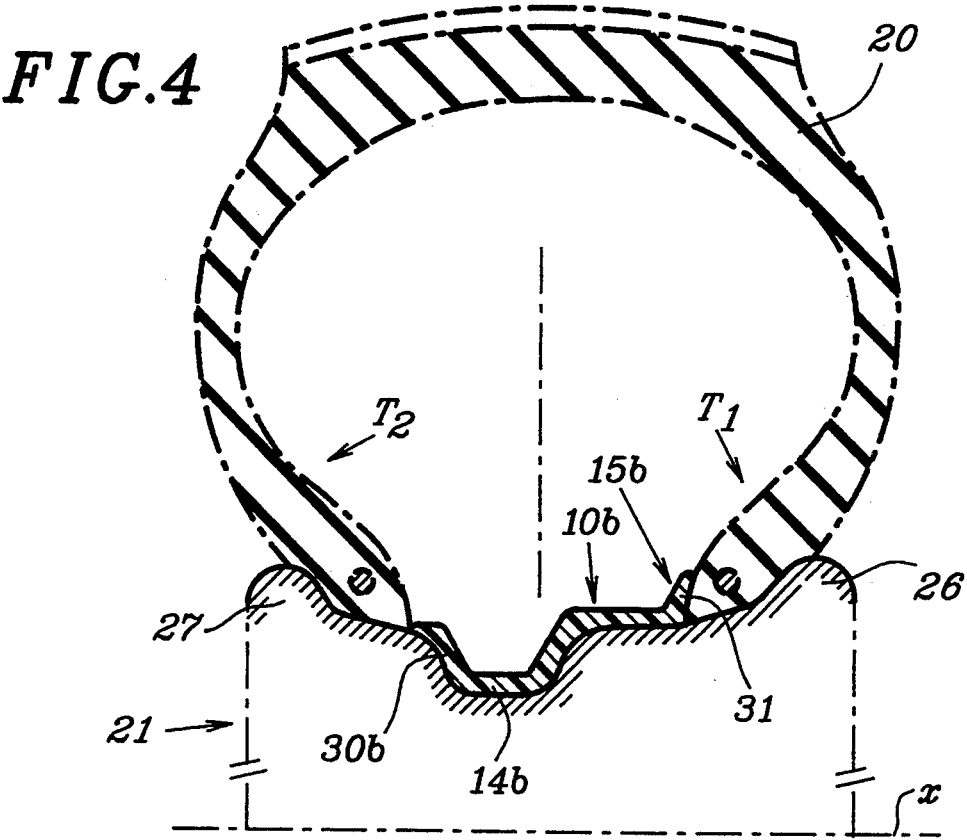

LOCKING INSERT DEVICE FOR A TIRE CHAMBER

The invention relates to a locking insert device for a tire chamber.

BACKGROUND OF THE INVENTION

Various embodiments are already known of locking insert devices for tire chambers, i.e. devices which when placed inside tubeless tires mounted on wheel rims prevent the beads of the tires from coming off their seats on the wheel rim, in particular when said rim is of the well or drop center type thus enabling the wheels fitted therewith to conserve their vehicle-driving ability even with punctured tires. Such devices are described, for instance in British Patent 1 348 892 or French Patents 2 311 667 and 2 271 945. Those known embodiments, which are generally intended for military vehicles or for very special civilian vehicles, are too expensive to be implemented on ordinary road transport vehicles such as trucks, buses, coaches, etc.

OBJECTS AND SUMMARY OF THE INVENTION

Consequently, a general object of the invention is to provide a locking insert device for a tire chamber that is well adapted in price and also in ease of installation and removal without special tooling to be implemented on vehicles having wheels with one-piece rims of the well or drop center type.

In this respect, a primary object of the invention is to provide such a device which will prevent the beads of a tire to come off their seats on the wheel rim, upon the tire being punctured, thus enabling the vehicle the wheels of which are fitted therewith to retain their vehicle-driving properties so that the vehicle can run for several kilometers on a flat tire.

Another object of the invention is to provide such a locking insert device for a tire chamber that is suitable for fitting to a wheel of a vehicle that is capable of travelling at high speed, the device consequently being light in weight and easy to manufacture.

The present invention provides a locking insert device for a tire chamber adapted to be fitted to a vehicle wheel provided with a tubeless tire mounted on a one-piece rim having a well or drop center, said device being designed to oppose the coming off of the beads of the tire from the rim in the event of a puncture by the fact that it comprises a strip of rigid material shaped as a ring split parallel to the axis of the rim equipped therewith at one location at least thus defining two substantially parallel free edges, the strip comprising an abutment means for at least one of said beads upon puncture of the tire, said strip further having a cross-section that corresponds at least in part to the shape of the rim against which it is pressed and held stationary when means for fastening together its free edges are rendered operative after the strip has been placed on the rim.

The strip may be made of metal sheet or of a reinforced thermoplastic or thermosetting resin based composite material, such as epoxy, phenolic or polyester resin reinforced with glass fibers or of a polyether block amide material of the type sold under the name "PEBAX" (a registered Trade Mark of ATOCHEM, FRANCE) or polyurethannes.

When the strip is made of a metal sheet, its circumferential borders are bent in order that said borders do not cut nor punch into the tire beads.

When the strip is made of a composite resin based material, an embodiment contemplates to choose the composite material among the family of sequenced polyamides adapted to be worked out by the RIM (Reaction Injection Molding) technics and to have said composite material reinforced with glass fiber reinforcements, thereby obtaining a material having very good mechanical characteristics as to traction strength and compression strength, which is good at withstanding fatigue, heating, and shocks, and which has a coefficient of expansion that is considerably smaller than that of the thermoplastic resin on its own, and thus is advantageously close to that of the material from which the rim is made.

The good mechanical characteristics of the material used enable the device to be given a small cross-section thus achieving low weight and facilitating installation of the device on the rim.

The cross-section of the strip is somewhat ⌐ shaped in the portion thereof that fits against the well of the rim and against the "large seat" of said rim onto which is seated a first bead of the tire which contacts the abutment means of the strip upon puncture of the tire.

In one embodiment the device of the invention includes a flange that ends in the vicinity of the second bead of the tire or is in contact therewith thereby preventing the second bead from moving laterally over the rim and coming off said rim upon puncture of the tire even when the latter is running flat, thus ensuring that the wheel retains its vehicle-driving ability and that the vehicle retains a large fraction of its steering stability upon puncture of said tire.

The invention contemplates to have the width of said strip substantially equal or very slightly less than the distance between the internal facing faces of said beads of said tire when the same is placed onto said rim.

In one embodiment, a spacer of elastomer type material selected from the family of flexible rubbers that have good characteristics of residual deformation under load, i.e. that have good resilient characteristics, is provided on the circumferential border of the strip that provides the abutment means.

According to the invention, the fastening means for securing the parallel free edges of the strip are of the screw/nut type or, in a modification, are of the toggle fastening type, with or without an adjustment spring for accommodating dimensional differences between the rims and the tires for wheels of the same nominal dimensions.

In a preferred embodiment of the screw/nut type fastening means, the screws are provided at the free end(s) of one or more cable(s) embedded in the strip and the nut is a coupling muff having two oppositely directed threads which draw towards one another the ends of the cable(s) when the muff is rotated on the screws to fix the strip onto the rim.

BRIEF DESCRIPTION OF THE DRAWINGS

The invention will be well understood by the following description given by way of example and made with reference to the accompanying drawings, in which:

FIG. 1 is a fragmentary section view through a tire chamber fitted with a device of the invention and mounted on a well or drop center type rim;

FIG. 2 is an elevation view of a device of the invention while it is being placed on a vehicle wheel rim;

FIG. 2A is a highly diagrammatic fragmentary detail view of the fastening means for an embodiment of the invention;

FIG. 3 is a view similar to FIG. 1, but for a different embodiment;

FIG. 4 is a view similar to FIGS. 1 and 3, but for yet another embodiment;

MORE DETAILED DESCRIPTION

Figure 2B:
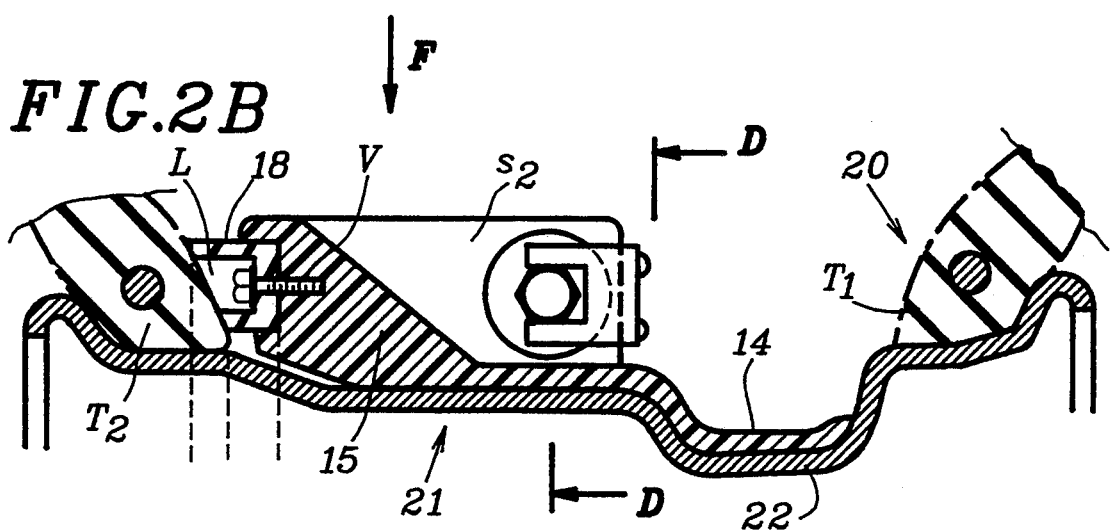
FIG. 2B is a partial view similar to FIG. 1 for a preferred embodiment.

Reference is first made to FIG. 1 which shows a locking insert device 10 according to the invention for use with a tire chamber and designed to be received inside a tubeless tire 20 mounted on a wheel rim 21, the rim being of the single-piece type, i.e. including a well or drop center 22 between a first portion 23 referred to as the "large seat" on which rests a first bead $T_1$ of the tire 20 and a second portion 24 referred to as the "small seat" on which rests the second bead $T_2$ of the tire 20, the outside edges of the portions 23 and 24 being bordered by respective shoulders 26 and 27 against which bear the beads $T_1$ and $T_2$ of the tire.

Figure 2C:
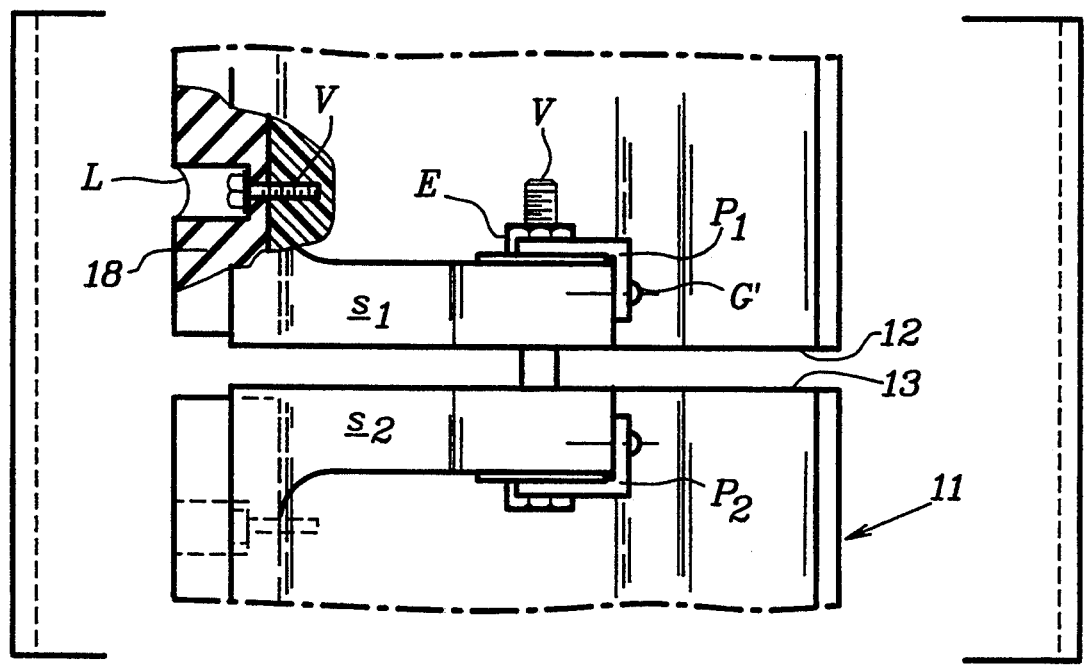
FIG. 2C is a view of the device according to arrow F of FIG. 2B with parts broken away.
Figure 2D:
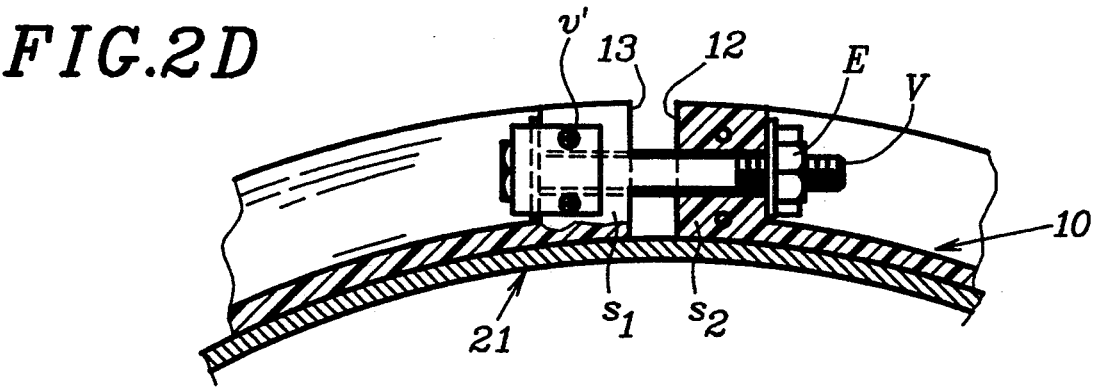
FIG. 2D is a section along line D—D of FIG. 2B.

The device 10 of the invention essentially comprises a strip of rigid material like metal sheet, or a plastics composite material made of a thermosetting resin such as epoxy, phenolic or polyester resin reinforced with glass fibers or a material chosen among appropriate polyurethannes or a polyether block amide type material such as the one sold under the name "PEBAX" (a Trademark of ATOCHEM, France), or of a material like polyester elastomers such as the one sold under the name "HYTREL" (a registerd Trade Mark of DU-PONT DE NEMOURS), or else a thermoplastic resin based material where the resin is selected from the family of sequenced polyamides adapted to be worked out by the reaction injection molding (RIM) technics and reinforced with glass fiber reinforcements. The strip 11 is in the form of a ring that is split parallel to the axis X of the rim to which it is fitted at one location, at least, but possibly at more locations, so that the ring has facing free ends 12 and 13 (FIG. 2). The ring 11 which has a cross-section that is somewhat ⌐ shaped thus shows a first portion 14, that is complementary in shape to the well or drop center 22 of the rim and a second portion 15 that is partially complementary in shape to the "large seat" 23 of the rim with which it is designed to cooperate, the portions 14 and 15 being interconnected by a third portion 16 designed to cooperate with and to fit snugly over the outside surface of the rim in its region interconnecting the well or drop center region 22 of the rim with its "large seat" 23.

In the embodiment described and shown, the portion 15, —which is an abutment means for holding the bead $T_1$ of the tire when the same is punctured or deteriorated—, is further provided on its circumferential border with a spacer 18 of elastomer type material, advantageously a flexible rubber that withstands well aging and which has good characteristics of residual deformation under (compression) load, in order to avoid creep.

According to the invention, the width 1 of the strip 11, i.e. the size of said strip measured parallel to the axis X of the wheel rim, is such that when said strip is mounted on the rim and its ends 12 and 13 are fastened together (in the manner explained below) with its portion 14 received in the drop center or well 22 of the rim, the abutment means 15 holds the bead $T_1$ of the tire 20 pressed against the shoulder 26 of the rim. In this assembled condition, the thrust force exerted by the device effectively prevents the tire from twisting or coming off the rim in the event of a puncture when the tire then takes up the shape shown in chain-dotted lines in FIG. 1.

To fasten together the two free ends 12 and 13 of the strip 11 so as to form a ring that is held stationary on the rim 21 after being placed thereon, the device of the invention also includes fastening means (as shown in FIGS. 2 and 2A) which may be made by a screw/nut assembly, as shown diagrammatically at 19, 19' in FIG. 2, or may be constituted, in another embodiment, by toggle fastener means as shown diagrammatically at 19a in FIG. 2A. Screw/nut type means enable dimensional differences in rims and tires for wheels having the same nominal size to be accommodated, with any such differences in dimensions being taken up in a toggle type system by means of a spring or by an adjustment screw.

When the fastening means are of the screw/nut type a preferred embodiment contemplates to have these means made of screws provided at the ends of a cable or cables, for instance 3 mm diameter cable(s) embedded in the strip, the nut being on a coupling muff which is internally threaded in two opposite directions, so that when said muff is rotatively operated, it brings close to one another the ends of the cable or cables and maintains the same in a fixed condition.

Having the strip 11 fixed on the rim prevents the device from twisting off and, consequently, prevents an unfavorable out-of-balance load, while the compression force exerted by the assembly comprising the spacer 18 and the abutment means 15 guarantees that the vehicle-driving ability of the vehicle is conserved in the event of a puncture, on account of the bead $T_1$ being held against the shoulder 26 of the rim.

When using a device of the invention, the bead $T_1$ is initially put into place on the rim 21 in contact with the shoulder 26, and the ring-shaped device 10 is then inserted into the cover of the tire, merely by deforming the strip in a twisting manner so that it takes up a "snail" shape as is made possible by the fact that the strip is split at least between its ends 12 and 13. The fastening means 19, 19' or 19a are then used to clamp the ring 10 onto the rim 21 until the condition shown in FIG. 1 is reached where the portion 14 of the device 10 is received in the bottom of the well 22 while the spacer 18 (fixed to the abutment means 15 by screws or by rivets) is urged against bead $T_1$ of the tire 20. After the bead $T_2$ has been put into place, inflation pressure is applied and the wheel is mounted on the vehicle that it is designed to equip.

Good results have been obtained in an embodiment where the strip 11 is made of a glass fiber reinforced thermoplastic resin of the type sold under the commercial name NYRIM (a trademark owned by DSM), and where the spacer 18 is made of a flexible EPDM type rubber having a hardness of about 65 on the Shore A scale. In this embodiment (FIGS. 2B, 2C, 2D) the fastening means of the strip are made of a screw V and a nut E passing through shoulders $s_1$ and $s_2$ provided at the free ends 12 and 13 of the strip, said fastening means being held into position by brake plates p1 and p2 fixed onto the shoulders by screws v'. In this embodiment, also, the spacer 18 is fixed onto the strip 11 by means of screws v located into recesses L of said spacer. Such a device is thus insensitive to corrosion and weighs about 1.5 kilograms for a 17.5 inch rim.

In the embodiment shown in FIG. 3, the device 10a has a somewhat channel-shaped cross section, having one abutment means 15a similar to the means 15 of the previous embodiment, a spacer 18a similar to the spacer 18, and a portion 14a that fits snugly in the drop center of the rim, said portion continuing towards the "small seat" 24 of the rim by a flange 30 that comes into contact with the second bead $T_2$ of the tire 20 after the device 10a has been placed on the rim, in identical manner to that described for the embodiment shown in FIGS. 1 and 2.

In the embodiment shown in FIG. 4, the device 10b includes a portion 14b similar to the portion 14 and 14a of the previous embodiments, and a flange 30b similar to the flange 30 of the FIG. 3 embodiment; in the present embodiment, however, the abutment means 15b is thinner than the means 15 and 15a of the previous embodiments and, in addition, it is not provided with a spacer 18 or 18a, which spacer is replaced by a portion 31 having a cross-section that is somewhat triangular and against which bears bead $T_1$ when the tire is punctured or dammaged with the entire device being of substantially constant thickness throughout its width.

Insofar as the devices of FIGS. 3 and 4 are also made of the same material as the device described with reference to FIGS. 1 and 2, the same advantages of lightness, lack of corrosion, shock resistance, expansion coefficient, etc. apply to these embodiments as well.

When the device is made of sheet metal, the circumferential borders thereof are bent to a somewhat U shaped section, or rolled, in order not to punch the tire beads $T_1$ and $T_2$.

Figure 5:
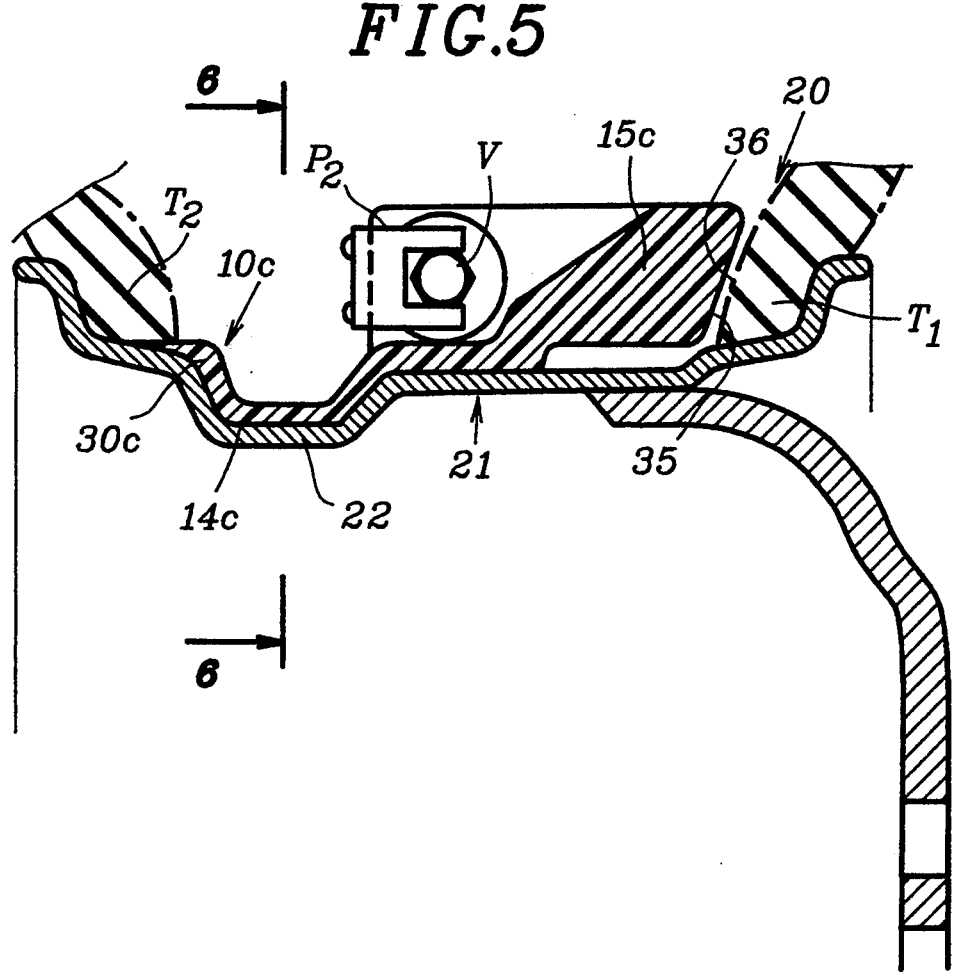
FIG. 5 is a partial view similar to FIG. 1, but for another embodiment.
Figure 6:
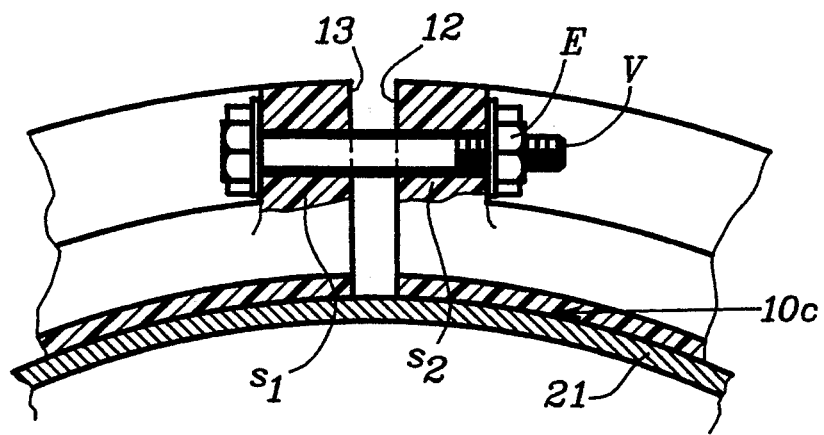
FIG. 6 is a section along line 6—6 of FIG. 5.

In the embodiment shown in FIGS. 5 and 6, the device 10c includes a portion 14c similar to the portions 14, 14a and 14b of the previous embodiments and a flange 30c similar to the flange 30b of the FIG. 4 embodiment. In this embodiment, however, the abutment means 15c is shaped substantially as the one shown in the first embodiment of FIG. 1 or in the embodiment of FIG. 2B, —that is somewhat thicker than the rest of the strip. The fastening means of the strip (that secure the free ends 12, 13 thereof and fix the strip onto the rim) are those shown in the embodiment of FIGS. 2B, 2C, 2D, that is a screw V and a nut E passing through shoulders s1 and s2 of the free ends 12, 13 of the strip and fixed by means of brake plates p1 and p2.

In this embodiment, also, the width of the strip measured parallely to the axis X of the wheel rim is slightly less than the distance between the inside facing faces of the beads $T_1$ and $T_2$, that is surface 35 of the abutment means 15c is not in contact with the internal face 36 of bead $T_1$ as long as the tire is in its normal condition, whereas said means acts as an abutment for said bead when the tire 20 is punctured.

We claim:

1. A locking insert device for a tire chamber adapted to be fitted to a vehicle wheel provided with a tubeless tire mounted on a well or drop center type rim, said device being designed to oppose the coming off of the beads of the tire from the rim in the event of a puncture of said tire, said device comprising a strip of rigid material shaped as a ring split parallel to the axis of said rim to form two free ends thereof, an abutment means on said strip in the vicinity of a first one of said beads for opposing movement thereof towards said drop center upon said tire being punctured or otherwise damaged, said ring having a cross-section that corresponds at least in part to the shape of the rim against which it is pressed, a spacer of elastomer type material shaped as a ring and selected within the family of flexible rubbers having good deformation characteristic of residual deformation under load and fixed on said abutment means and means for fastening together one said free end to the other said free end of said strip to hold said strip stationary on the rim when said fastening means are rendered operative after the ring has been placed on said rim.

2. A locking insert device according to claim 1, wherein said rigid material is chosen among metal sheet, a reinforced thermoplastic or thermosetting resin based composite material, polyether block amides and polyurethannes.

3. A device according to claim 2, wherein the thermoplastic resin of said composite material is selected from the family of sequenced polyamides adapted to be worked out by the reaction injection molding (RIM) techniques and is reinforced with glass fiber reinforcements.

4. A device according to claim 1, wherein the cross-section of the strip is somewhat ⌐ shaped in the portion thereof that fits against the well of said rim and against the "large seat" of said rim on which rests a first bead of said tire adapted to cooperate with said abutment means.

5. A device according to claim 1, wherein the strip has a somewhat channel cross-section shape and further comprises a flange designed to come into contact with the second bead of the tire that is not in the vicinity of said abutment means.

6. A device according to claim 1, wherein the means for fastening together the free ends of said strip are of the screw/nut type.

7. A device according to claim 6, wherein said fastening means are made of screw means provided at the end of a cable or cables embedded within said strip and wherein said nut is a coupling provided with opposedly threads tapered on its internal surface.

8. A device according to claim 1, wherein the means for fastening together the free ends of said strip are of the toggle fastener type.

9. A device according to claim 1, wherein the width of said strip is substantially equal or very slightly less than the distance between the internal facing faces of said beads of said tire when the same is placed onto said rim.

10. A locking insert device for a tire chamber adapted to be fitted to a vehicle wheel provided with a tubeless tire mounted on a well or drop center type rim, said device being designed to oppose the coming off of the beads of the tire from the rim in the event of a puncture of said tire, said device comprising a strip of rigid material shaped as a ring split parallel to the axis of said rim to form two free ends thereof and having a circumferential border, an abutment means on said strip in the vicinity of a first one of said beads for opposing movement thereof towards said drop center upon said tire being damaged, said ring having a cross-section that corresponds at least in part to the shape of the rim against which it is pressed, means for fastening together one said free end to the other said free end of said strip to hold said strip stationary on said rim after said ring has been placed on said rim, said abutment means including a spacer of elastomer type material selected from within the family of flexible rubbers having good deformation characteristics of residual deformation under load and fixed on said abutment means, said spacer on said circumferential border of said strip.

11. The device of claim 10, wherein said spacer includes recesses within said spacer, said spacer fixed onto said strip by fastening means located in said recesses.

* * * * *